(12) United States Patent
Piotrowski

(10) Patent No.: US 6,350,400 B1
(45) Date of Patent: Feb. 26, 2002

(54) METHOD FOR PRODUCING FLEXIBLE PVC

(75) Inventor: Bernhard Piotrowski, Lohmar (DE)

(73) Assignee: HT Troplast AG, Troisdorf (DE)

( * ) Notice: Subject to any disclaimer, the term of this patent is extended or adjusted under 35 U.S.C. 154(b) by 0 days.

(21) Appl. No.: 09/445,393

(22) PCT Filed: Jun. 3, 1998

(86) PCT No.: PCT/DE98/01501

§ 371 Date: Dec. 6, 1999

§ 102(e) Date: Dec. 6, 1999

(87) PCT Pub. No.: WO98/55536

PCT Pub. Date: Dec. 10, 1998

(30) Foreign Application Priority Data

Jun. 4, 1997 (DE) .......................... 197 23 467

(51) Int. Cl.⁷ ............................... B29C 47/36
(52) U.S. Cl. ....................... 264/211; 264/349
(58) Field of Search ............... 264/211, 210.6, 264/177.2, 349, 211.23

(56) References Cited

U.S. PATENT DOCUMENTS

| | | | |
|---|---|---|---|
| 3,679,788 A | | 7/1972 | Hiroshi et al. |
| 4,711,908 A | * | 12/1987 | Hawrylko |
| 4,877,568 A | * | 10/1989 | Austin |
| 5,053,444 A | * | 10/1991 | Trotoir |
| 5,137,969 A | * | 8/1992 | Marten et al. |
| 5,929,153 A | * | 7/1999 | Mori et al. |

FOREIGN PATENT DOCUMENTS

| | | |
|---|---|---|
| EP | 611250 | 8/1994 |
| WO | 9115347 | 10/1991 |

* cited by examiner

*Primary Examiner*—Mark Eashoo
(74) *Attorney, Agent, or Firm*—Millen, White, Zelano & Branigan, P.C.

(57) ABSTRACT

The invention relates to a process for producing plasticized thermoplastic products, in particular flexible PVC, by means of an extruder wherein a thermoplastic processed with plasticizer to give a dry blend and a plasticizer are combined and heated to form the final product.

15 Claims, 2 Drawing Sheets

METHOD FOR PRODUCING FLEXIBLE PVC

TECHNICAL SECTOR

When extrusion and/or calendering are used in industry to produce products from plasticized thermoplastics, in particular flexible PVC, the PVC powder is treated with the plasticizer and, if desired, with other additives in a combined heating/cooling mixer system to give what is known as a dry blend, or at a higher temperature to give an agglomerated material. This dry blend or agglomerated material may then be processed by conventional extrusion to give the desired products. Preparation of a dry blend usually takes place at a temperature of from about 50 to 100° C., and during this all of the plasticizer penetrates into the individual PVC grains, giving a dry, free-flowing mixture.

PRIOR ART

The preparation of a dry blend or agglomerate required for extruding plasticized PVC almost always takes place in batches, and considerably more energy, time and technical equipment are necessitated by this additional step.

OBJECT

The object of the present invention is therefore to provide a simplified process for producing products made from plasticized thermoplastics, in particular flexible PVC, by means of an extruder.

DESCRIPTION OF THE INVENTION

Figure 1:
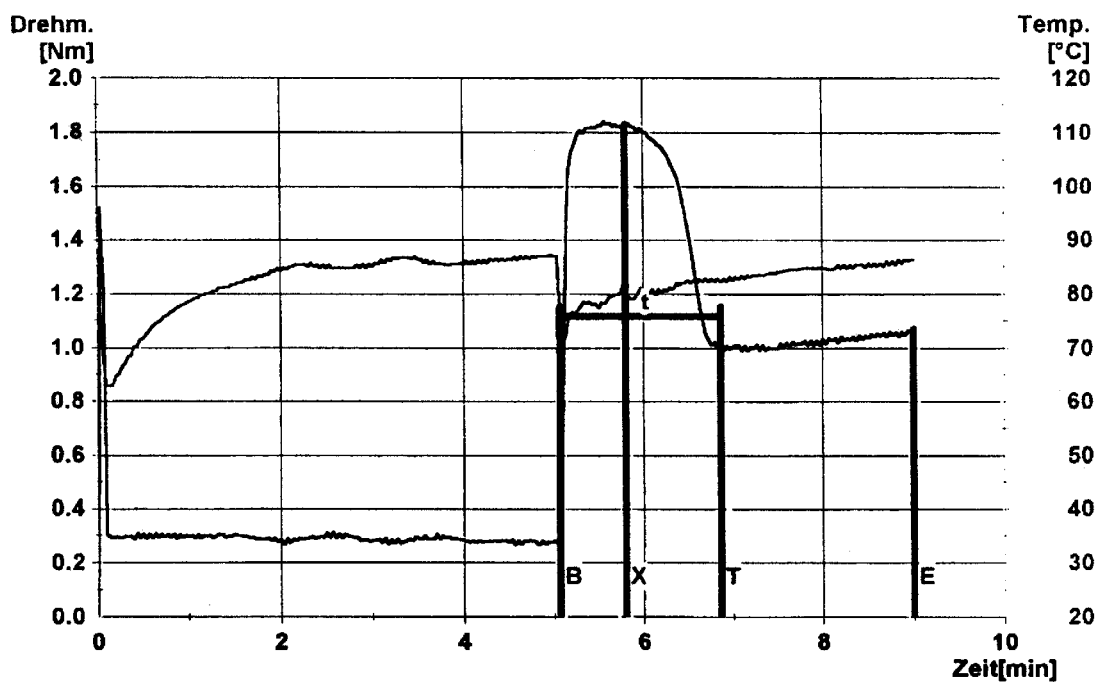
FIGS. 1–4 show torque and temperature curves for experiments 1–4, respectively.
Figure 2:
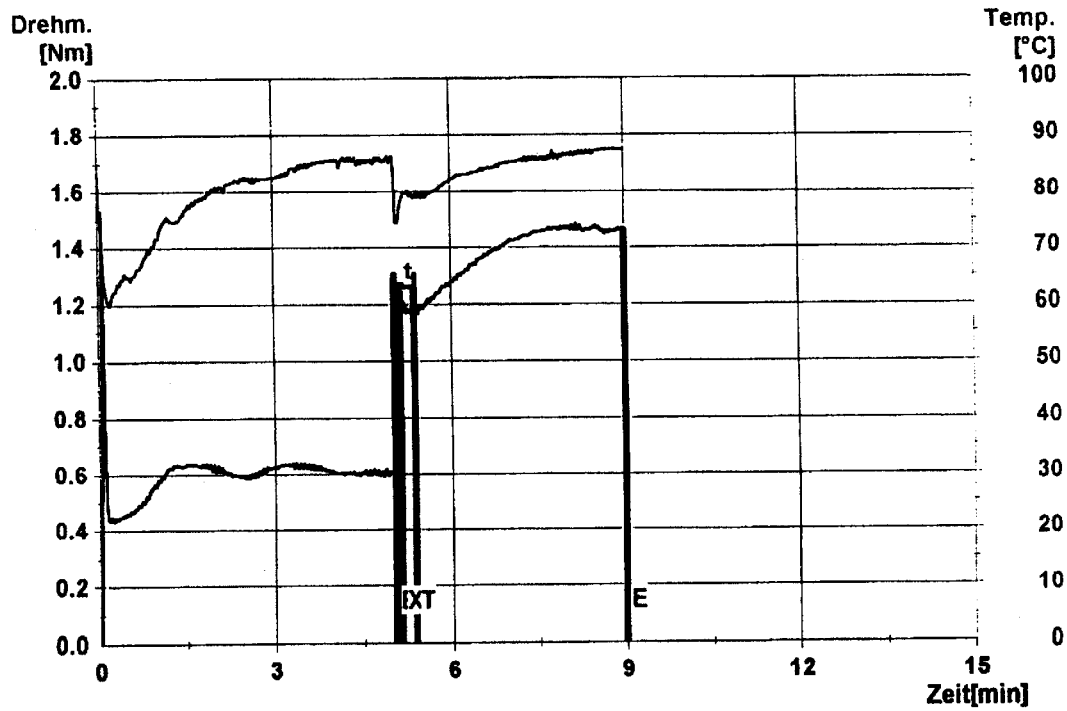
Figure 3:
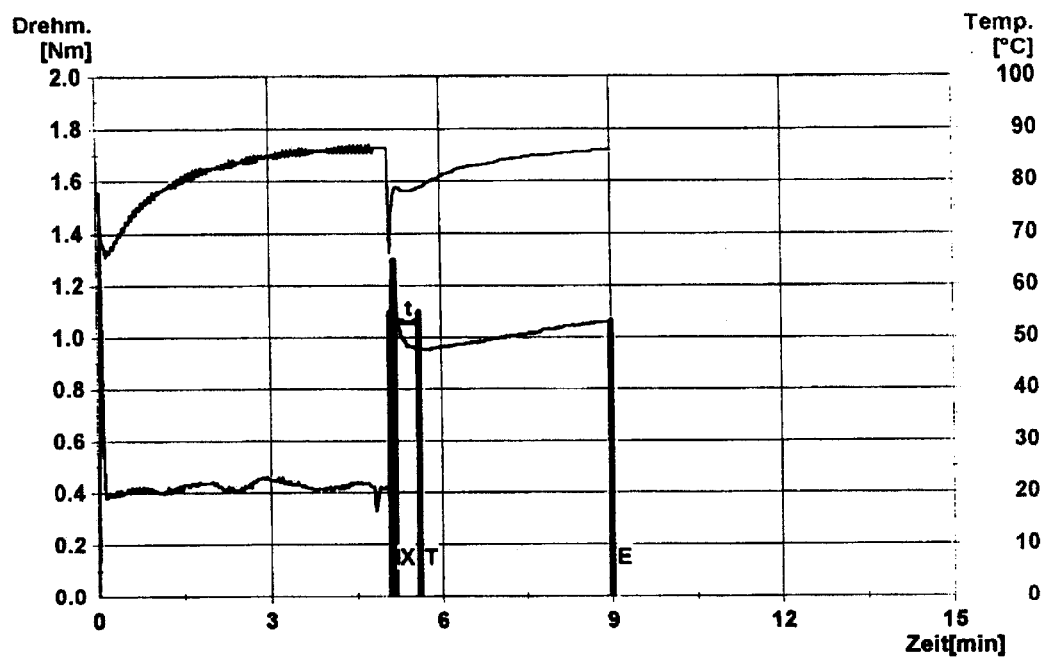
Figure 4:
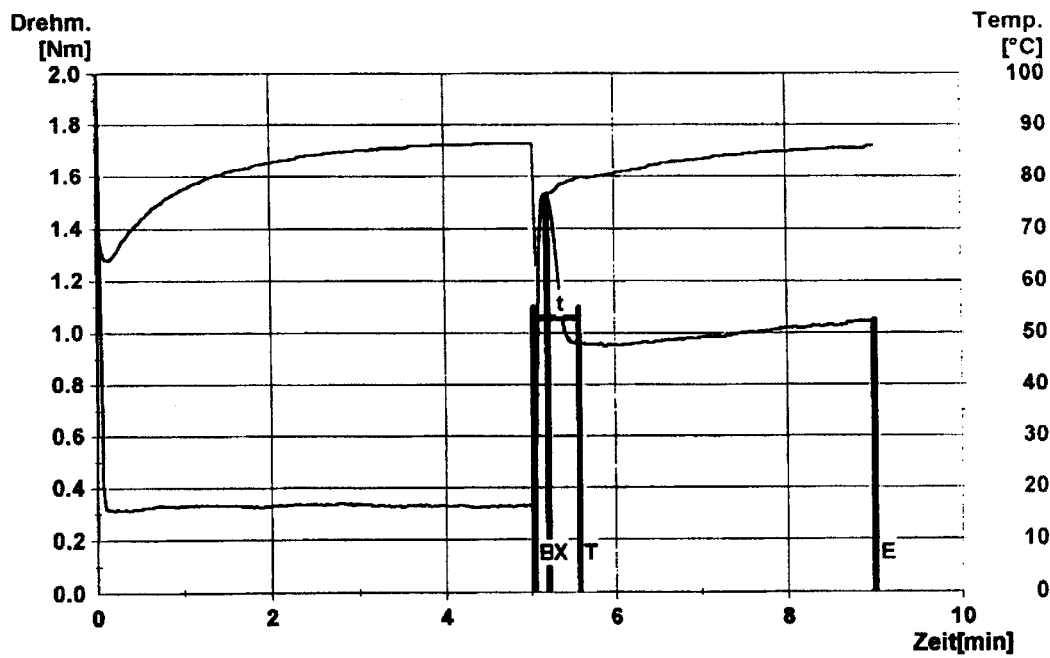

The invention achieves this object via a process with the features of claim 1, preferably in association with one or more of the features in the subclaims.

The invention is therefore based on the surprising new finding that it is possible to introduce the plasticizer directly into the PVC powder in the extruder as long as the plasticizer-PVC mixture has a certain period of time available within the extruder to permit complete penetration into the PVC particles before a temperature of about 145° C. has been reached. According to the present invention, a sufficient time for this, in terms of the average residence time of the material until a melt temperature of about 145° C. has been achieved, is from 10 to 120 sec. This discovery was particularly surprising since during conventional premixing of the plasticizer with the PVC powder in a combined heating/cooling mixer system (dry blend production) considerably longer times are needed to achieve absorption of all of the plasticizer by the PVC powder. It appears that the conditions present in the extruder—high temperature, the pressure prevailing there and the high shearing energy introduced via friction—promote absorption of the plasticizer by the PVC powder.

At the point where the plasticizer was injected, melt temperatures below the freezing point of the thermoplastic used should be avoided as far as possible, since at these temperatures there is inadequate absorption of plasticizer.

Relatively short plasticizer absorption times are achieved in a preferred embodiment of the invention, in particular by injecting the plasticizer while the thermoplastic is at a relatively high temperature, i.e. at a point relatively distant from the feed zone of the extruder. The average temperature of the thermoplastic at the plasticizer injection point should preferably be from about 90 to 120° C., particularly preferably from 100 to 110° C. Lower temperatures necessitate a longer plasticizer absorption time, while at higher temperatures the upper limit for the permissible maximum temperature to complete plasticizer absorption is reached too rapidly. In the latter case it is sometimes necessary for part of the extruder jacket to be cooled in an area downstream of the injection point, to avoid premature overstepping of the maximum temperature.

Although it is not essential to preheat the plasticizer to approximately the temperature of the thermoplastic at the injection point, this does promote plasticizer absorption.

The PVC/plasticizer mixture should also be mixed as intensively as possible immediately after injecting the plasticizer, for example via particular mixing elements on the screw or via a specific design of the extruder, in particular that of a planetary-gear extruder. The latter is particularly preferable since the residence time distribution of the mixture here is particularly narrow, that is to say all of the particles require approximately the same residence time to reach the maximum temperature of about 145° C. for complete plasticizer absorption.

In a particularly preferred embodiment of the invention, prior to the extruder some of the plasticizer is processed with the PVC powder in a manner known per se to give a dry blend, while the main part of the plasticizer is added within the extruder and not before. Surprisingly, it has been found that even relatively small amounts of plasticizer added to the PVC powder prior to the extrusion procedure shorten the plasticizer absorption time for the remainder of the plasticizer to a fraction of the time needed to absorb the entire amount of the plasticizer within the extruder. Although this particularly preferred procedure necessitates an additional mixer for mixing the PVC powder with the portion of the plasticizer, the mixers needed are substantially smaller than for the prior art and the outlay in terms of energy and time is substantially lower than for preparing a dry blend.

Even very small amounts of from 2 to 5% of the total amounts of plasticizer used are sufficient to achieve this surprising result. It is therefore preferable to add from 2 to 30% by weight, in particular from 5 to 15% by weight, of the entire plasticizer used prior to the extruder and correspondingly to add from 98 to 70% by weight, preferably from 95 to 85% by weight, within the extruder.

The injection of the plasticizer is not per se critical. Although it is possible to use specific ring-type distributors for this, it is sufficient to use a simple aperture through the extruder jacket, or a number of apertures arranged next to one another or in sequence, through which the plasticizer is continuously introduced by pumping.

Since the viscosity of the thermoplastic depends to a considerable extent on the proportion of plasticizer, to avoid jamming the extruder the extruder control should be designed so that the extruder is halted immediately if the plasticizer feed is interrupted, or is run until empty at a low rotation rate. Likewise, when the plant is shut down the plasticizer feed should not be shut down until appropriate time has passed after the feed of the solid components has been shut down.

In particular when using the process with premixing of some of the plasticizer, use may be made of conventional twin-screw extruders, and it is therefore even possible to operate the novel process on existing plants without substantial alteration.

Wherever this description refers to PVC powder as the thermoplastic to be used, this is merely an example. The principle of the invention is also suitable for other thermoplastics whose microstructure is similar to that of PVC and whose plasticizer absorption capability is in principle similar. Preference is given to S-PVC (suspension PVC), and the plasticizer is preferably a primary plasticizer.

To illustrate the effect of improved plasticizer absorption when premixing part of the plasticizer, the following Experiments (comparative experiments) 1 to 4 were carried out: in the first experiment, which corresponds to the prior art, 390 g of a dry mixture composed of PVC powder, stabilizer and a small amount of filler (titanium dioxide) was placed in a Brabendere test kneader (PL2100 PLASTI-CORDER) with jacket temperature controlled to 88° C. and kneaded for 5 min at a constant rotation rate of 100 rpm. After these 5 min, 210 g of plasticizer were added and the mixture, initially still wet, was further kneaded at a constant rotation rate. After a total of 9 min the experiment was ended. The melt temperature curve and torque curve were recorded for the entire duration of the experiment. For comparison with this, the same overall mixture was studied in Experiments 2 to 4, but here some of the plasticizer was processed in advance with the PVC powder to give a dry blend.

The mixtures used in the experiments are given in Table 1 below together with the results—drying time and energy absorbed during drying.

TABLE 1

|  | Experiment 1 = Graph 1 | Experiment 2 = Graph 2 | Experiment 3 = Graph 3 | Experiment 4 = Graph 4 |
| --- | --- | --- | --- | --- |
| S-PVC powder [g] | 365.63 | 365.63 | 365.63 | 365.63 |
| DOP plasticizer (premixture) [g] | 0.00 | 91.70 | 41.79 | 20.89 |
| Stabilizer mixture | 12.77 | 12.77 | 12.77 | 12.77 |
| Titanium dioxide | 11.61 | 11.61 | 11.61 | 11.61 |
| Premixture total [g] | 390.00 | 481.70 | 431.79 | 410.89 |
| Plasticizer addition [g] | 210.00 | 118.30 | 168.21 | 189.11 |
| Total weight of sample [g] | 600.00 | 600.00 | 600.00 | 600.00 |
| Proportion of plasticizer added in advance [%] | 0% | 44% | 20% | 10% |
| Drying time [s] | 108 | 20 | 30 | 32 |
| Energy dissipated [Nm] | 1824 | 237 | 328 | 398 |

The torque curves and temperature curves recorded while carrying out the experiments are shown in graphs 1 to 4 (FIG. 1–4), where in each case the juncture at which the plasticizer is added is indicated by "B", the juncture at which torque reaches a maximum is indicated by "X", the juncture at which torque reaches a minimum after addition of the plasticizer, defined as the dryness point, is indicated by "T" and the end of the experiment is indicated by "E". It can clearly be seen that in Experiment 1=graph 1=FIG. 1, in which the entire amount of plasticizer was added within the test kneader, the torque suddenly increases after plasticizer addition to a value of about 1.8 Nm, and then pulls away again to the minimum value of about 1 Nm after 108 s, when all of the plasticizer has been absorbed.

In contrast to this, the plasticizer absorption in Experiments 2 to 4 takes place in a fraction of this time, specifically in 20 s in Experiment 2 to 32 s in Experiment 4. There is also a significant reduction in the energy introduced by friction during plasticizer absorption, from 1824 Nm to 237 Nm in Experiment 2 and 398 Nm in Experiment 5.

Comparative Example
(Prior Art)

In a comparative example, flexible PVC in the form of a dry blend is plastified according to the prior art in an extruder and then calendered to give a film. The mix used for this is composed of

TABLE 2

| Component | Proportion | Amount per mixer charge |
| --- | --- | --- |
| S-PVC powder [g] | 61% | 305 kg |
| DOP plasticizer [g] | 35% | 175 kg |
| Stabilizer mixture | 2% | 10 kg |
| Titanium dioxide | 2% | 10 kg |
| Totals | 100% | 500 kg | is processed as follows to give a dry blend: the solid components are charged to a 500 kg Henschel mixer and homogenized for about 2 min. The temperature at this juncture is 60° C. The plasticizer is added as liquid component, continuously over a period of 90 sec while stirring continues, and the initially wet mixture is further agitated. Within 8 min after plasticizer addition, the dryness point is reached at a final temperature of 75° C. The dry blend is then charged to a cooling mixer, cooled to a final temperature of 40° C and charged to a silo for feeding a plastifying extruder In a second operation, the cooled dry blend is plastified in a commercially available planetary-gear extruder with a single-screw feed zone, feed zone length 4 D, followed by a planetary-gear section, length 8 D. The temperature of the plastified composition as it leaves the extruder is 178° C., and it is then immediately molded on a 4-roll F calender to give a waterproofing sheet of 0.8 mm thickness.

Examples of the Working of the Invention

EXAMPLE 1

(Inventive)

Here, the PVC web produced was the same as that in the comparative example, using the same mixture and the same apparatus, but only 10% by weight of the total plasticizer was added into the Henschel mixer:

TABLE 3

| Component | Proportion | Amount per mixer charge |
| --- | --- | --- |
| S-PVC powder [g] | 89% | 445.3 kg |
| DOP plasticizer [g] | 5% | 25.5 kg |
| Stabilizer mixture | 3% | 14.6 kg |
| Titanium dioxide | 3% | 14.6 kg |
| Totals | 100% | 500 kg |

In each mixing procedure it was possible to process about 45% more PVC and additives, since the amount of plasticizer was smaller. As little as 2 min after addition of the plasticizer, the dryness point was reached in the Henschel mixer, and the temperature of the dry blend at this juncture was 65° C. The resultant dry blend with a low plasticizer content was immediately fed to a silo, and no cooling in a cooling mixer was necessary.

The low-plasticizer mixture was then fed, as in the comparative example, to a planetary-gear extruder, for technical data see the comparative example. A ring-shaped nozzle system with a distribution duct and a total of 12 injection orifices distributed around its circumference was attached directly at the entrance to the planetary-gear section. Measurements carried out in advance gave the temperature of the PVC composition at this point as about 105° C. The plasticizer was heated to a temperature of about 80° C. and pumped into the planetary-gear extruder by means of a metering pump. Experiments showed that practically all of the plasticizer had been absorbed by the PVC after a path length of 4 D when the composition had achieved an average temperature of 130° C., the average residence time after addition of the plasticizer being 15 sec. In the following part of the planetary-gear extruder, the composition was further homogenized and plastified, so that it left the plastifying extruder, as in the comparative example, with a temperature of 178° C. As in the comparative example, the plastified composition was then molded on a 4-roll F calender to give a waterproofing sheet of 0.8 mm thickness.

By injecting the plasticizer in the extruder, the capacity needed in the heated mixer could be reduced to less than 40% of the previous value, and the cooling mixer could be dispensed with entirely. The total energy consumed by the system here could therefore also be substantially reduced.

The waterproofing sheets produced in the comparative example and in the inventive Example 1 were subjected to a mechanical test, with the result that, within the limits of accuracy of measurement, all of the physical data were identical.

The sheets were also tested for plasticizer loss. For this, each sheet sample was subjected to a vacuum (oil-pump vacuum) for 7.5 h and 13 h at 130° C. and the plasticizer loss determined:

TABLE 4

| Time | Plasticizer loss Comparative experiment | Plasticizer loss Example 1 |
|---|---|---|
| 7.5 h | 1.1% | 0.8% |
| 13 h | 1.6% | 1.4% |

The test results therefore show that the plasticizer loss value has improved by about 20%.

EXAMPLE 2
(Inventive)

As in Example 1, a premix was first prepared with a low plasticizer content of in total 10% by weight of the plasticizer used. This premix was then fed to a twin-screw extruder, length 36 D. Temperature measurements were first used to determine that the ideal injection point for the plasticizer was at 5 D. The temperature of the composition at this point was about 100° C. The plasticizer was injected via simple apertures through the jacket, by means of a metering pump, again with a temperature of 100° C. The provision for the screw was optimized by using kneading elements known per se, to give the best possible mixing downstream of the plasticizer injection point. After an average residence time of 40 sec the composition achieved an average temperature of 140° C., and all of the plasticizer had been absorbed by the PVC material. The composition was then further homogenized and plastified over the remaining length of the screw and molded in a slot die to give a film of thickness 0.8 mm.

What is claimed is:

1. A process for producing products from plasticized thermoplastics by means of an extruder, comprising the following steps:

providing a plasticizer and particulate thermoplastic;

processing a portion of the plasticizer with the particulate thermoplastic to form a dry blend;

feeding resultant dry blend directly to an extruder and heating said dry blend in a first section of said extruder to a temperature of from 50 to 140° C.;

injecting remaining platicizer, directly into the extruder;

mixing the dry blend and and the remaining plasticizer homogeneously in the extruder wherein the resultant mixture is further heated by friction and the mixing is conducted so that the average residence time of the material from the injection of said remaining platicizer to reaching an average temperature of 145° C. in the material is from 10 to 120 s, and so that all of the plasticizer is absorbed by the thermoplastic; and wherein the resultant homogeneous mixture made from thermoplastic and plasticizer is heated to a temperature above 145° C. and thus plasticized or completely melted; and shaping the resultant plasticized or completely melted mixture to give the desired product.

2. The process as claimed in claim 1, wherein from 2 to 30% by weight of the plasticizer is added prior to the extruder and from 98 to 70% by weight of the plasticizer is added within the extruder.

3. The process as claimed in claim 2, wherein from 5 to 15% of the plasticizer is added prior to the extruder and from 95 to 85% by weight of the plasticizer is added in the extruder.

4. The process as claimed in claim 3, wherein said thermoplastic comprises PVC and said plasticizer comprises a primary plasticizer.

5. The process as claimed in claim 2, wherein said thermoplastic comprises PVC and said plasticizer comprises a primary plasticizer.

6. The process as claimed in claim 1, wherein PVC is used as thermoplastic and a primary plasticizer is used as plasticizer.

7. The process according to claim 6 wherein the PVC is suspension PVC and the primary plasticizer comprises dioctyl phthalate (DOP).

8. The process as claimed in claim 1, wherein the temperature of the thermoplastic is from 90 to 120° C., when the plasticizer is injected.

9. The process as claimed in claim 8 wherein the temperature is 100 to 110° C.

10. The process as claimed in claim 9, wherein said thermoplastic comprises PVC and said plasticizer comprises a primary plasticizer.

11. The process as claimed in claim 8, wherein said thermoplastic comprises PVC and said plasticizer comprises a primary plasticizer.

12. The process as claimed in claim 1, wherein the extruder used is a twin-screw extruder.

13. The process as claimed in claim 12, wherein said thermoplastic comprises PVC and said plasticizer comprises a primary plasticizer.

14. The process as claimed in claim 1 further comprising preheating said remaining plasticizer before injecting it into the extruder.

15. The process as claimed in claim 1 wherein said remaining plasticizer is preheated to approximately the temperature of the dry blend in the extruder at the injection point before injecting said remaining plasticizer into the extruder.

* * * * *